(12) United States Patent
Weng et al.

(10) Patent No.: US 12,282,178 B2
(45) Date of Patent: Apr. 22, 2025

(54) OPTICAL FILM AND DISPLAY DEVICE (71) Applicant: Coretronic Corporation, Hsin-Chu (TW)

(72) Inventors: Chao-Hung Weng, Hsin-Chu (TW); Hung-Tse Lin, Hsin-Chu (TW); Kuan-Wen Liu, Hsin-Chu (TW); Hao-Jan Kuo, Hsin-Chu (TW); Ming-Dah Liu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 18/731,401

(22) Filed: Jun. 3, 2024

(65) Prior Publication Data
US 2024/0411063 A1  Dec. 12, 2024

(30) Foreign Application Priority Data
Jun. 9, 2023  (CN) .......................... 202310679542.5

(51) Int. Cl.
*F21V 8/00*  (2006.01)
*G02B 5/02*  (2006.01)

(52) U.S. Cl.
CPC .......... *G02B 5/0278* (2013.01); *G02B 6/0051* (2013.01)

(58) Field of Classification Search
CPC ............................ G02B 5/0278; G02B 6/0051
See application file for complete search history.

(56) References Cited

U.S. PATENT DOCUMENTS

| 11,181,774 B2 * | 11/2021 | Gwon ............... G02F 1/133605 |
| 2008/0043455 A1 * | 2/2008 | Chang ................... G02B 5/0215 |
| | | 362/23.18 |
| 2021/0200002 A1 * | 7/2021 | Kim ...................... G02F 1/1334 |

FOREIGN PATENT DOCUMENTS

| CN | 109239830 A | * | 1/2019 | .......... G02B 5/0242 |
| JP | 2008151854 A | * | 7/2008 | |
| TW | I463201 B | | 12/2014 | |
| TW | 201820647 A | | 6/2018 | |
| TW | 201910893 A | | 3/2019 | |

OTHER PUBLICATIONS

English translation of Makita JP-2008151854-A (Year: 2008).*
English translation of Zhai CN-109239830-A (Year: 2019).*
The first Office Action, dated Apr. 26, 2024, in counterpart Taiwan Application No. 112121683.

* cited by examiner

*Primary Examiner* — Evan P Dzierzynski (57) ABSTRACT

An optical film includes a grid layer having a first surface, a second surface, light-shading portions, and light-transmitting portions. The light-shading portions and the light-transmitting portions are located between the first surface and the second surface, and the light-shading portions and the light-transmitting portions are alternately arranged along the first surface. Each light-shading portion has a third surface, a fourth surface, a fifth surface, a sixth surface, and a seventh surface. An angle between the fourth and third surfaces is A1, an angle between the fifth and third surfaces is A2, an angle between the sixth and second surfaces is A3, and an angle between the seventh and second surfaces is A4. Wherein $85°<A1≤90°$, $85°<A2≤90°$, $0°<A3<85°$, $0°<A4<85°$, $A2≠A4$, and $A1≠A3$. A display device is also provided.

18 Claims, 11 Drawing Sheets

OPTICAL FILM AND DISPLAY DEVICE

CROSS-REFERENCE TO RELATED APPLICATION

This application claims the priority benefit of the China application (No. 202310679542.5), filed on Jun. 9, 2023. The entirety of the above-mentioned patent application is hereby incorporated by reference herein and made a part of this specification.

FIELD OF THE INVENTION

The present invention relates to an optical element, and more particularly to an optical film and a display device having the aforementioned optical film.

BACKGROUND OF THE INVENTION

According to different types of light sources, conventional display devices can include liquid crystal display devices, light-emitting diode (LED) display devices, organic light-emitting diode (OLED) display devices, etc. For example, the main components of a liquid crystal display device include a backlight module, a display panel, and an outer frame. The backlight module can be divided into an edge-type backlight module and a through-type backlight module. In general, the edge-type backlight module has a lower cost, while through-type backlight module is more conducive to achieving local dimming. In addition, each of the aforementioned display devices is usually provided with an optical film to adjust the imaging effect according to different needs.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

In order to achieve one or a portion of or all of the objects or other objects, an embodiment of the invention provides an optical film, which includes a grid layer. The grid layer has a first surface, a second surface, a plurality of light-shading portions, and a plurality of light-transmitting portions. The first surface is opposite and parallel to the second surface. The light-shading portions and the light-transmitting portions are located between the first surface and the second surface, and the light-shading portions and the light-transmitting portions are alternately arranged along the first surface. Each of the light-shading portions has a third surface, a fourth surface, a fifth surface, a sixth surface, and a seventh surface. The third surface is coplanar with the first surface. The fourth surface and the fifth surface are respectively connected to opposite sides of the third surface. An angle degree of a first included angle between the fourth surface and the third surface is A1, and an angle degree of a second included angle between the fifth surface and the third surface is A2. The sixth surface is connected to the fourth surface and the second surface. The seventh surface is connected to the fifth surface and the second surface. An angle degree of a third included angle between the sixth surface and the second surface is A3, and an angle degree of a fourth included angle between the seventh surface and the second surface is A4. Wherein 85°≤A1≤90°, 85°<A2≤90°, 0°<A3<85°, 0°<A4<85°, A2≠A4, and A1≠A3.

In order to achieve one or a portion of or all of the objects or other objects, an embodiment of the invention provides a display device, which includes a light guide plate, a light source, a display panel, and an optical film. The light guide plate has a light incident surface and a light exiting surface. The light exiting surface is connected to the light incident surface. The light source is arranged opposite to the light incident surface. The display panel is arranged opposite to the light exiting surface. The optical film is arranged between the light exiting surface and the display panel.

The optical film of the present invention adopts a grid layer, and the grid layer has a plurality of light-shading portions and a plurality of light-transmitting portions. In detail, the two opposite sides of the light-shading portion respectively have two surfaces connected and inclined to each other (i.e., the fourth surface, the fifth surface, the sixth surface, and the seventh surface), and the light-transmitting portion is located between the adjacent two light-shading portions. Therefore, the beam can incident on the fourth surface or the fifth surface when passing through the light-transmitting portion, then be reflected by the fourth surface or the fifth surface and then exit from the grid layer. Based on the above, the angle of the beam emitted from the grid layer is smaller than the angle of the beam incident to the grid layer. Therefore, the optical film of the present invention can reduce stray light formed due to excessive output angle. Due to the use of the aforementioned optical film, the display device of the present invention can reduce the stray light at a large angle of view, thereby improving image quality.

Other objectives, features and advantages of the invention will be further understood from the further technological features disclosed by the embodiments of the invention wherein there are shown and described preferred embodiments of the present invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
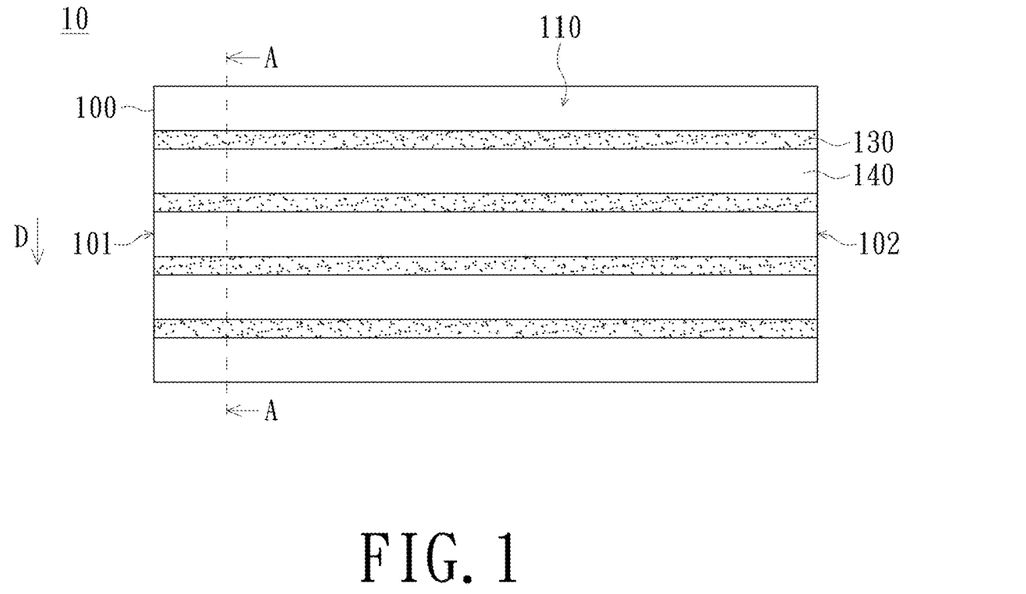
FIG. 1 is a schematic top view of an optical film according to an embodiment of the present invention.
Figure 2:
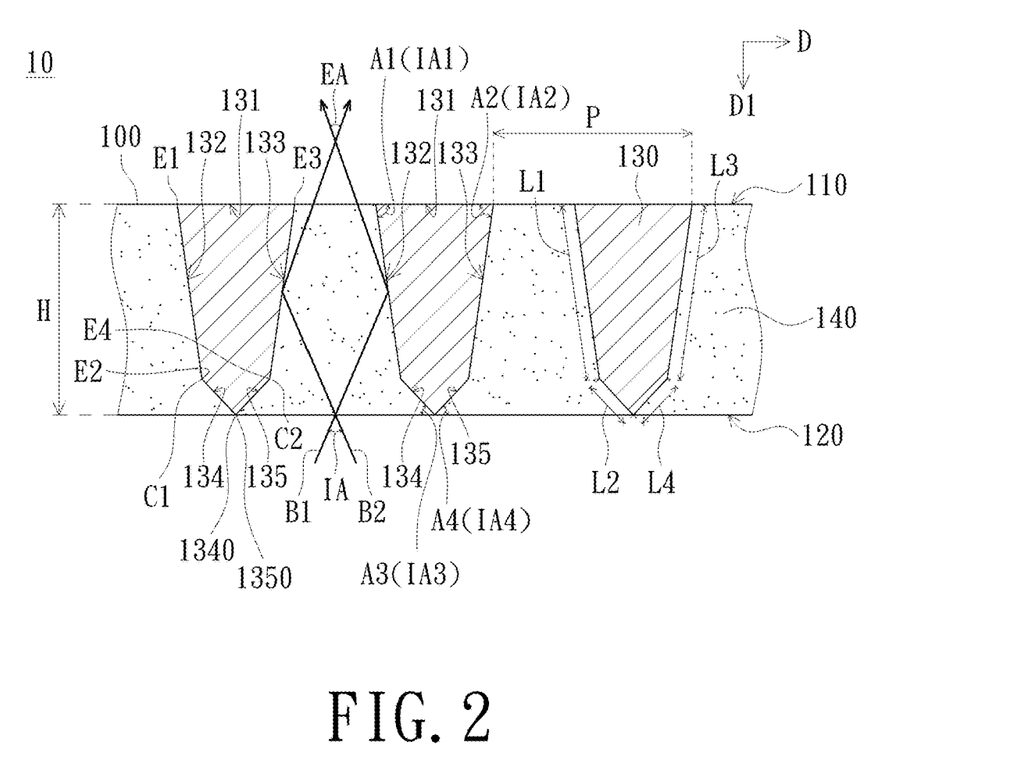
FIG. 2 is a schematic partial cross-sectional view of the optical film, taken along the line A-A in FIG. 1.

FIG. 1 is a schematic top view of an optical film according to an embodiment of the present invention. FIG. 2 is a schematic partial cross-sectional view of the optical film, taken along the line A-A in FIG. 1. Please refer to FIGS. 1 and 2. The optical film 10 includes a grid layer 100. The grid layer 100 has a first surface 110, a second surface 120 (depicted in FIG. 2), a plurality of light-shading portions 130, and a plurality of light-transmitting portions 140. The first surface 110 is opposite and parallel to the second surface 120. The light-shading portions 130 and the light-transmitting portions 140 are located between the first surface 110 and the second surface 120, and the light-shading portions 130 and the light-transmitting portions 140 are alternately arranged along the first surface 110. Each light-shading portion 130 has a third surface 131, a fourth surface 132, a fifth surface 133, a sixth surface 134, and a seventh surface 135. The third surface 131 is coplanar with the first surface 110. The fourth surface 132 and the fifth surface 133 are connected to the opposite sides of the third surface 131, respectively. The angle degree of the first included angle IA1 between the fourth surface 132 and the third surface 131 is A1, and the angle degree of the second included angle IA2 between the fifth surface 133 and the third surface 131 is A2. The sixth surface 134 is connected to the fourth surface 132 and the second surface 120. The seventh surface 135 is connected to the fifth surface 133 and the second surface 120. The angle degree of the third included angle IA3 between the sixth surface 134 and the second surface 120 is A3, and the angle degree of the fourth included angle IA4 between the seventh surface 135 and the second surface 120 is A4. The angle degrees A1, A2, A3, and A4 satisfy the equations: $85°<A1\leq90°$, $85°<A2\leq90°$, $0°<A3<85°$, $0°<A4<85°$, $A2\neq A4$, and $A1\neq A3$. From FIG. 1, it can be seen that each light-shading portion 130 can extend from the first side 101 of the grid layer 100 to the second side 102 of the grid layer 100 opposite to the first side 101, but the present invention is not limited to this.

The light-transmitting portion 140 is configured to allow the beams B1 and B2 (shown in FIG. 2) to pass therethrough. In this embodiment, the material of the light-transmitting portion 140 may include ultraviolet curing adhesive. Incidentally, the light-transmitting portion 140 is attached to and covers the outer surface of the light-shading portion 130. For example, in this embodiment, the light-transmitting portion 140 is attached to and covers the fourth surface 132, the fifth surface 133, the sixth surface 134, and the seventh surface 135 of the light-shading portion 130.

Please continue to refer to FIG. 2. The light-shading portion 130 can reflect the beams B1 and B2 by the fourth surface 132 and the fifth surface 133. Specifically, the fourth surface 132 and the fifth surface 133 can tilt relative to each other and relative to the first surface 110, thereby forming the first included angle IA1 and the second included angle IA2, respectively. Therefore, after being reflected by the fourth surface 132 and the fifth surface 133, the beams B1 and B2 can exit from the grid layer 100 at a smaller angle than the angle incident on the grid layer 100, thereby reducing the angle at which the beams B1 and B2 exit from the grid layer 100. For example, the beams B1 and B2 incident at a beam angle IA to the grid layer 100 and exit at a beam angle EA from the grid layer 100, wherein the beam angle EA is smaller than the beam angle IA. Furthermore, the light-shading portion 130 and the light-transmitting portion 140 are alternately arranged in the direction D, for example, so that the light-shading portion 130 can reduce the beam angle EA of the beams B1 and B2 emitted from the grid layer 100 in the direction D (also depicted in FIG. 1). In one embodiment, the fourth surface 132 and the fifth surface 133 can be substantially perpendicular to the first surface 110. In other words, the angle degrees of the first included angle IA1 and the second included angle IA2 can be approximately 90°, which can further reduce the beam angle EA of the beams B1 and B2 emitted from the grid layer 100. Incidentally, the material of the light-shading portion 130 can include ultraviolet curing adhesive and carbon black. In one embodiment, the material of the light-shading portion 130 may include a light-reflecting material, which can also increase the light utilization rate. However, the present invention does not impose any further limitations on the material of the light-shading portion 130.

In this embodiment, each light-shading portion 130 may further have a first corner C1 and a second corner C2. Each fourth surface 132 has a first edge E1 and a second edge E2 opposite to each other. The first edge E1 is adjacent to the third surface 131. The second edge E2 is connected to the sixth surface 134, and the first corner C1 is located between the fourth surface 132 and the sixth surface 134. Each fifth surface 133 has a third edge E3 and a fourth edge E4 opposite to each other. The third edge E3 is adjacent to the third surface 131. The fourth edge E4 is connected to the seventh surface 135, and the second corner C2 is located between the fifth surface 133 and the seventh surface 135. In the first direction D1 pointing from the first surface 110 to the second surface 120, each first corner C1 and each second corner C2 are far away from the first surface 110 and close to the second surface 120, so as to further reduce the beam angle EA of the beams B1 and B2 emitted from the grid layer 100. In other words, the length L1 of the fourth surface 132 can be greater than the length L2 of the sixth surface 134, while the length L3 of the fifth surface 133 can be greater than the length L4 of the seventh surface 135, so that the first corner C1 and the second corner C2 are away from the first surface 110 and close to the second surface 120. In this embodiment, the first corner C1 can be adjacent to the second edge E2 and the sixth surface 134, while the second corner C2 can be adjacent to the fourth edge E4 and the seventh surface 135. Incidentally, the quantity of the first corner C1 and the second corner C2 each are depicted as one, and the shape of the light-shading portion 130 is depicted as a pentagon, but the present invention is not limited to this. For example, in one embodiment, the quantity of the first corner C1 and the second corner C2 each may be greater than one, and the shape of the light-shading portion 130 may not be limited to a pentagon.

In this embodiment, the side 1340 of the sixth surface 134 of each light-shading portion 130 connected to the second surface 120 is adjacent to the side 1350 of the seventh surface 135 connected to the second surface 120. For example, the side 1340 of the sixth surface 134 and the side 1350 of the seventh surface 135 are adjacent to each other to form a sharp corner. However, in one embodiment, the side 1340 of the sixth surface 134 and the side 1350 of the seventh surface 135 are adjacent to each other to form a rounded corner. The present invention does not impose any restrictions on the shape of the connection between the sixth surface 134 and the seventh surface 135.

In this embodiment, in the direction D where the light-shading portions 130 and the light-transmitting portions 140 are alternately arranged along the first surface 110, the distance P between the third edge E3 of the fifth surface 133 of one light-shading portion 130 and the third edge E3 of the fifth surface 133 of the adjacent another one light-shading portion 130 can be between 30 um and 200 um. Specifically, the third edge E3 is, for example, connected to the third surface 131 and coplanar with the first surface 110 and the third surface 131. In other words, the distance P can be the distance between the third edges E3 of the adjacent two light-shading portions 130 in the direction D. Incidentally, the light-shading portions 130 of this embodiment can be equidistant from each other, that is, the distance P between any two adjacent light-shading portions 130 can be equal to each other, but the present invention is not limited to this. On the other hand, in this embodiment, the distance H between the first surface 110 and the second surface 120 in the first direction D1 can be between 30 um and 200 um. Similarly, the distance H of each light-shading portion 130 can be substantially equal to each other. However, in other embodiments, the distance H of each light-shading portion 130 may be slightly different, and the present invention does not impose any further limitations on this.

Compared to the conventional technology, the optical film 10 of this embodiment adopts a grid layer 100, and the grid layer 100 has a plurality of light-shading portions 130 and a plurality of light-transmitting portions 140. In detail, the two opposite sides of the light-shading portion 130 respectively have two surfaces connected and inclined to each other (i.e., the fourth surface 132, the fifth surface 133, the sixth surface 134, and the seventh surface 135), and the light-transmitting portion 140 is located between the adjacent two light-shading portions 130. The beams B1 and B2 can incident on the fourth surface 132 or the fifth surface 133 when passing through the light-transmitting portion 140, then be reflected by the fourth surface 132 or the fifth surface 133, and then exit from the grid layer 100. Based on the above, the beam angle EA of the beams B1 and B2 emitted from the grid layer 100 is smaller than the beam angle IA of the beams B1 and B2 incident to the grid layer 100. Therefore, the optical film 10 of this embodiment can reduce stray light formed due to excessive output angle.

Incidentally, in one embodiment, the absolute value of the difference in refractive index between the light-shading portion 130 and the light-transmitting portion 140 is, for example, greater than 0.005 to enhance the light reflectivity of the grid layer 100. Furthermore, the refractive index of the light-shading portion 130 can be less than that of the light-transmitting portion 140, making it easier for the beams B1 and B2 to have total reflection within the light-transmitting portion 140, thereby improving the luminance of the beams B1 and B2 emitted from the grid layer 100. However, the refractive index of the light-shading portion 130 can be greater than that of the light-transmitting portion 140 in another embodiment, and the present invention is not limited to this.

Figure 3:
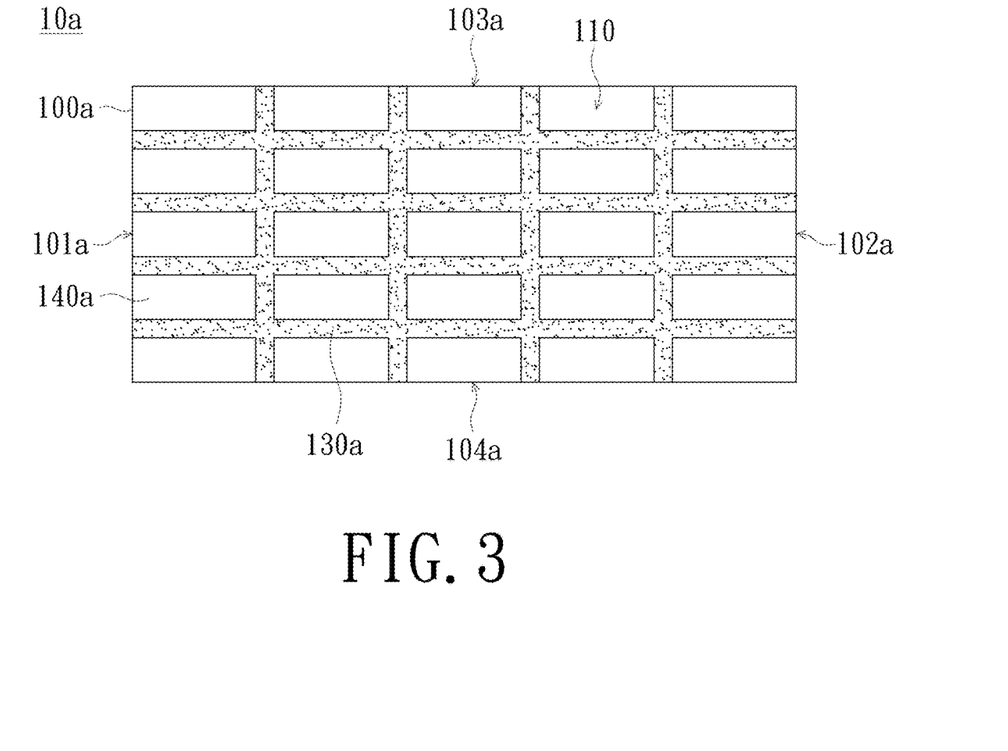
FIG. 3 is a schematic top view of an optical film according to another embodiment of the present invention.

FIG. 3 is a schematic top view of an optical film according to another embodiment of the present invention. It can be understood that in other embodiments, the extension direction of the light-shading portion 130 may not be limited to those shown in FIGS. 1 and 2. For example, as shown in the optical film 10a in FIG. 3, a portion of the light-shading portions 130a extends from the first side 101a of the grid layer 100a to the second side 102a of the grid layer 100a opposite to the first side 101a, and the other portion of the light-shading portions 130a extends from the third side 103a of the grid layer 100a to the fourth side 104a of the grid layer 100a opposite to the third side 103a, and the first side 101a and the third side 103a are mutually perpendicular (e.g., substantially perpendicular to each other). In other words, the light-shading portions 130a of this embodiment can be arranged in a checkerboard shape in the grid layer 100*a*. Because the structure and advantages of the light-shading portion 130*a* and the light-transmitting portion 140*a* are roughly the same as those of the embodiment in FIG. 1, no redundant detail is to be given herein.

Figure 4:
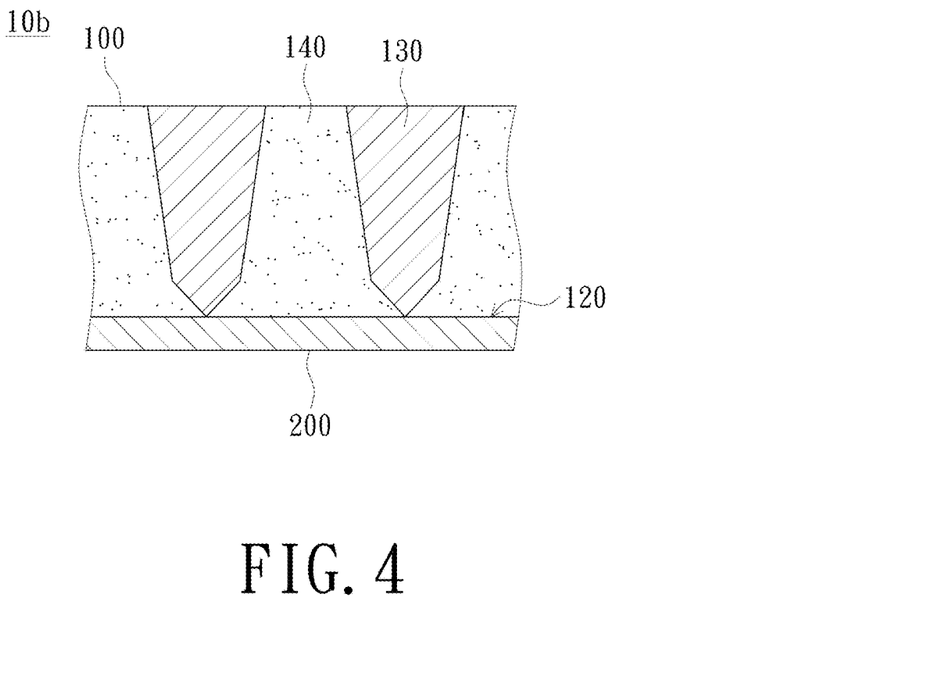
FIG. 4 is a schematic partial cross-sectional view of an optical film in another embodiment of the present invention.

FIG. 4 is a schematic partial cross-sectional view of an optical film in another embodiment of the present invention. The structure and advantages of the optical film 10*b* in this embodiment are similar to those of the embodiment in FIG. 1, and the differences are described below. Please refer to FIG. 4. The optical film 10*b* further includes, for example, a first light-transmitting plate 200. The first light-transmitting plate 200 is arranged on the side of the second surface 120 away from the light-shading portion 130. For example, in this embodiment, the first light-transmitting plate 200 can be attached to the second surface 120 of the grid layer 100. In this way, the light-shading portion 130 and the light-transmitting portion 140 can be fixed on the first light-transmitting plate 200 to prevent the light-shading portion 130 and the light-transmitting portion 140 from detaching from each other, thereby improving the structural strength of the optical film 10*b*. In this embodiment, the material of the first light-transmitting plate 200 may include polyethylene terephthalate (PET), but other embodiments are not limited to this.

Figure 5:
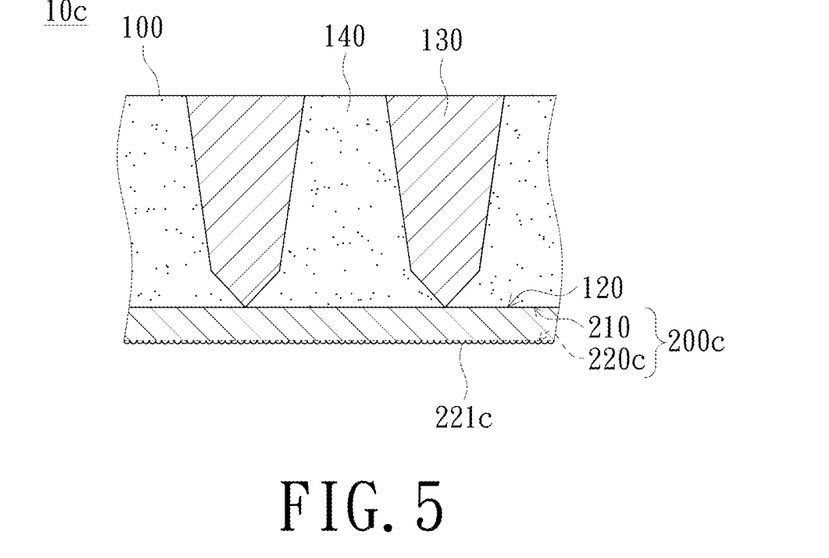
FIG. 5 is a schematic partial cross-sectional view of an optical film in another embodiment of the present invention.
Figure 6:
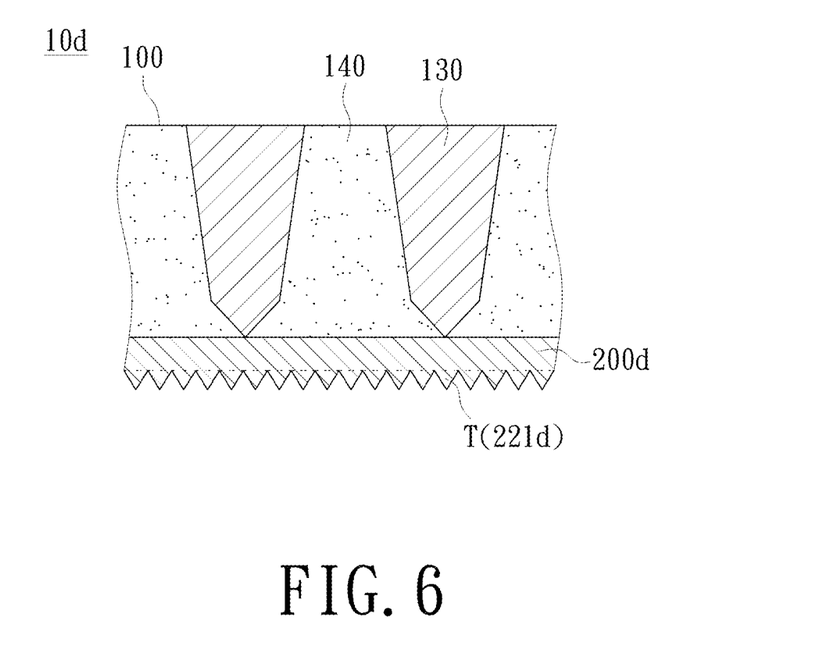
FIG. 6 is a schematic partial cross-sectional view of an optical film in another embodiment of the present invention.

FIG. 5 is a schematic partial cross-sectional view of an optical film in another embodiment of the present invention. FIG. 6 is a schematic partial cross-sectional view of an optical film in another embodiment of the present invention. The structures and advantages of the optical films 10*c* and 10*d* are similar to those in the embodiment of FIG. 4, and the differences are described below. Please refer to FIG. 5 first. The first light-transmitting plate 200*c* can have a first light-transmitting surface 210 and a second light-transmitting surface 220*c*. The first light-transmitting surface 210 and the second light-transmitting surface 220*c* are opposite to each other, and the first light-transmitting surface 210 is arranged on the side of the second surface 120 (e.g., the second surface 120) away from the light-shading portion 130. The second light-transmitting surface 220*c* can have a plurality of first microstructures 221*c* to enhance the optical characteristics of the optical film 10*c*. For example, in this embodiment, the first microstructure 221*c* can be formed by roughening the second light-transmitting surface 220*c* to increase the uniformity of light output of the optical film 10*c*. However, in one embodiment as shown in FIG. 6, the first microstructure 221*d* may include a prism structure T. In this way, the beam angle of the beam incident from the first light-transmitting plate 200*d* to the grid layer 100 can be further reduced, thereby further reducing the beam angle of the beam exiting from the grid layer 100. It can be understood that the present invention does not impose any specific restrictions on the shapes of the first microstructures 221*c* and 221*d*.

Figure 7:
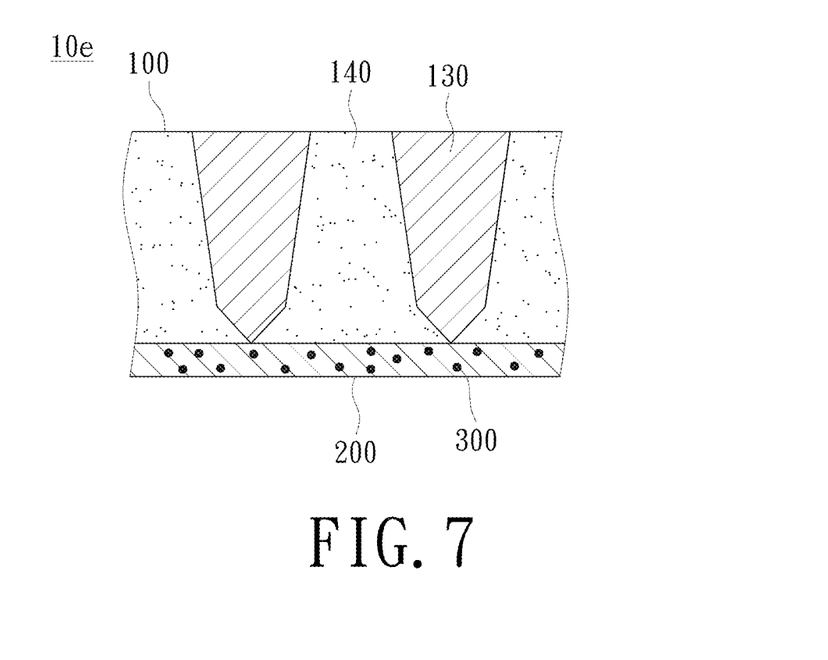
FIG. 7 is a schematic partial cross-sectional view of an optical film in another embodiment of the present invention.

FIG. 7 is a schematic partial cross-sectional view of an optical film in another embodiment of the present invention. The structure and advantages of the optical film 10*e* in this embodiment are similar to those in the embodiment of FIG. 4, and the differences are described below. Please refer to FIG. 7. The optical film 10*e* may further include a plurality of first light-scattering particles 300. The first light-scattering particles 300 are arranged within the first light-transmitting plate 200. In this way, it can further enhance the optical characteristics of the optical film 10*e*. In this embodiment, the material of the first light-scattering particle 300 can include a light-reflecting material, which can be uniformly distributed within the first light-transmitting plate 200.

Figure 8:
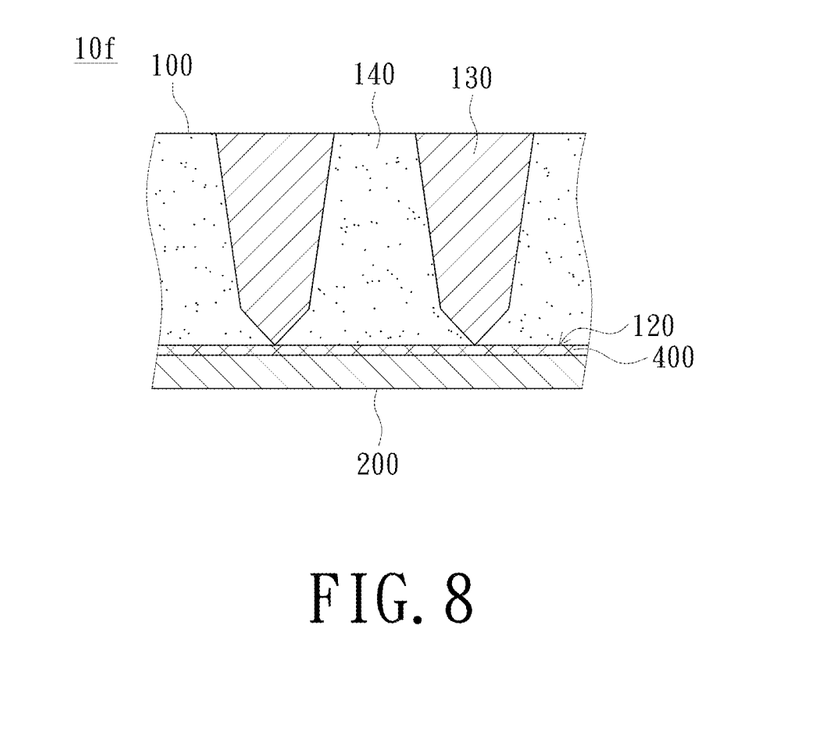
FIG. 8 is a schematic partial cross-sectional view of an optical film in another embodiment of the present invention.

FIG. 8 is a schematic partial cross-sectional view of an optical film in another embodiment of the present invention. The structure and advantages of the optical film 10*f* in this embodiment are similar to those in the embodiment of FIG. 4, and the differences are described below. Please refer to FIG. 8. The optical film 10*f* may further include a light-transmitting layer 400. The light-transmitting layer 400 is arranged between the second surface 120 and the first light-transmitting plate 200. In other words, the light-transmitting layer 400 can be sandwiched between the second surface 120 and the first light-transmitting plate 200. In this embodiment, the material of the light-transmitting layer 400 may be the same as the material of the light-transmitting portion 140, but the present invention does not impose any further limitations on this.

Figure 9:
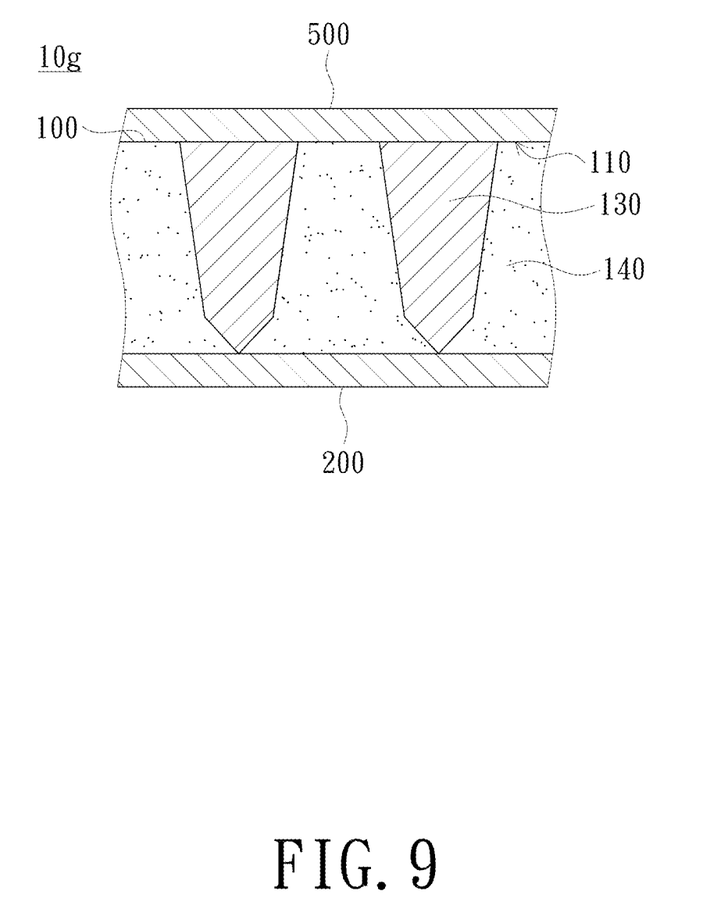
FIG. 9 is a schematic partial cross-sectional view of an optical film in another embodiment of the present invention.

FIG. 9 is a schematic partial cross-sectional view of an optical film in another embodiment of the present invention. The structure and advantages of the optical film 10*g* in this embodiment are similar to those in the embodiment of FIG. 4, and the differences are described below. Please refer to FIG. 9. The optical film 10*g* may further include a second light-transmitting plate 500. The second light-transmitting plate 500 is arranged on the first surface 110 of the grid layer 100. In this way, the first light-transmitting plate 200 and the second light-transmitting plate 500 can further fix the light-shading portions 130 and the light-transmitting portions 140, thereby further enhancing the structural strength of the optical film 10*g*. In one embodiment, the second light-transmitting plate 500 includes, for example, a dual brightness enhancement film (DBEF), which can also enhance the luminance of output light of the optical film 10*g*. Incidentally, in another embodiment, the second light-transmitting plate 500 may include a prism sheet. The other features of the second light-transmitting plate 500 are the same as those of the first light-transmitting plate 200, and no redundant detail is to be given herein.

Figure 10:
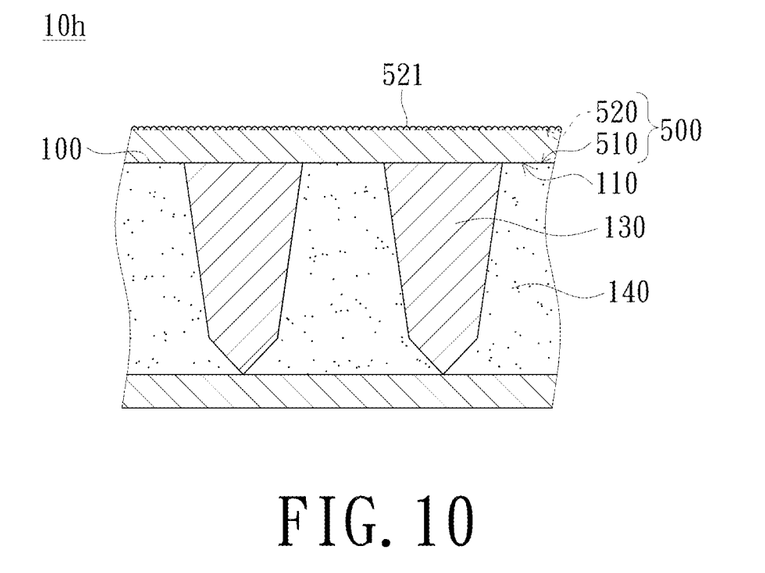
FIG. 10 is a schematic partial cross-sectional view of an optical film in another embodiment of the present invention.

FIG. 10 is a schematic partial cross-sectional view of an optical film in another embodiment of the present invention. The structure and advantages of the optical film 10*h* in this embodiment are similar to those in the embodiment of FIG. 9, and the differences are described below. Please refer to FIG. 10. The second light-transmitting plate 500 may have a third light-transmitting surface 510 and a fourth light-transmitting surface 520. The third light-transmitting surface 510 and the fourth light-transmitting surface 520 are opposite to each other, and the third light-transmitting surface 510 is arranged on the first surface 110. The fourth light-transmitting surface 520 has, for example, a plurality of second microstructures 521 to enhance the optical characteristics of the optical film 10*h*. The features of the second microstructure 521 are the same as those of the first microstructure 221*c* in FIG. 5 or the first microstructure 221*d* in FIG. 6, and no redundant detail is to be given herein.

Figure 11:
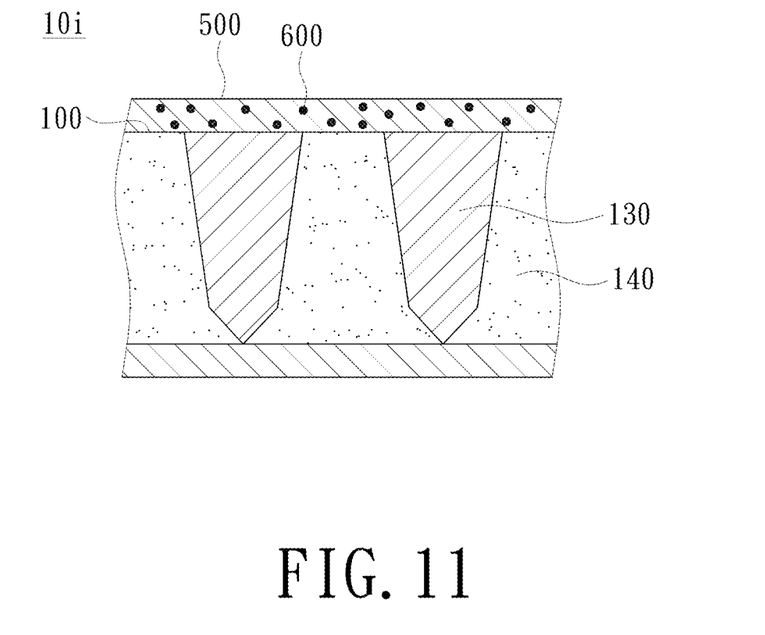
FIG. 11 is a schematic partial cross-sectional view of an optical film in another embodiment of the present invention.

FIG. 11 is a schematic partial cross-sectional view of an optical film in another embodiment of the present invention. The structure and advantages of the optical film 10*i* in this embodiment are similar to those in the embodiment of FIG. 9, and the differences are described below. Please refer to FIG. 11. The optical film 10*i* may further include a plurality of second light-scattering particles 600. The second light-scattering particles 600 are arranged inside the second light-transmitting plate 500. In this way, it can further enhance the optical characteristics of the optical film 10*i*. The features of the second light-scattering particle 600 are the same as those of the first light-scattering particle 300 in FIG. 7, and no redundant detail is to be given herein.

Figure 12:
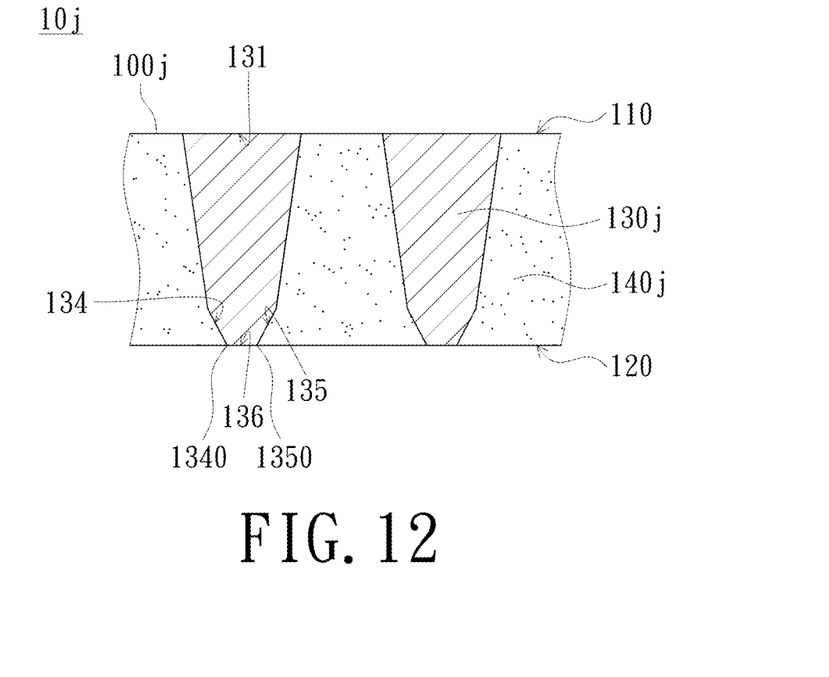
FIG. 12 is a schematic partial cross-sectional view of an optical film in another embodiment of the present invention.

FIG. 12 is a schematic partial cross-sectional view of an optical film in another embodiment of the present invention. The structure and advantages of the optical film 10g in this embodiment are similar to those in the embodiment of FIG. 1, and the differences are described below. Please refer to the grid layer 100j in FIG. 12. The side 1340 of the sixth surface 134 of each light-shading portion 130j connected to the second surface 120 is not adjacent to the side 1350 of the seventh surface 135 connected to the second surface 120. In other words, the side 1340 of the sixth surface 134 and the side 1350 of the seventh surface 135 can be separated from each other. For example, the light-shading portion 130j may further have an eighth surface 136. The eighth surface 136 can be connected between the side 1340 of the sixth surface 134 and the side 1350 of the seventh surface 135. In addition, for example, the eighth surface 136 may be opposite to the first surface 110 and the third surface 131, and may be coplanar with the second surface 120. However, the present invention does not limit the specific structure of the separation between the sixth surface 134 and the seventh surface 135. Incidentally, the shape of the light-transmitting portion 140j can be changed according to the shape of the light-shading portion 130j, so that the light-transmitting portion 140j can fill the space between the adjacent two light-shading portions 130j and attach to the outer surface of the light-shading portion 130j. The present invention does not impose any further restrictions on the shape of the light-transmitting portion 140j.

Figure 13:
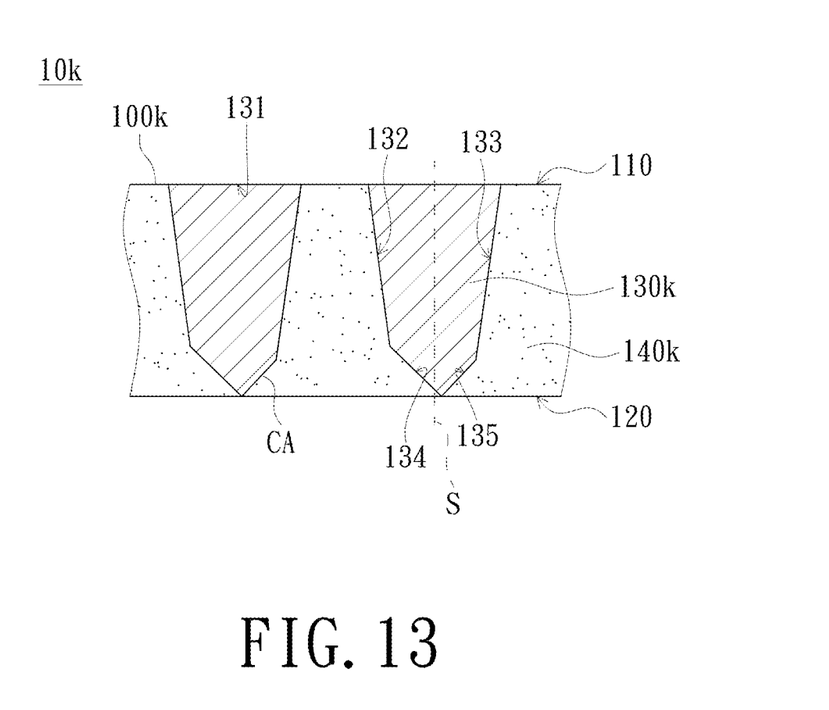
FIG. 13 is a schematic partial cross-sectional view of an optical film in another embodiment of the present invention.

FIG. 13 is a schematic partial cross-sectional view of an optical film in another embodiment of the present invention. The structure and advantages of the optical film 10k in this embodiment are similar to those in the embodiment of FIG. 1, and the differences are described below. Please refer to the grid layer 100k in FIG. 13. The cross-section CA of each light-shading portion 130k extending from the first surface 110 to the second surface 120 can be in an asymmetric shape. It should be noted that the opposite sides of the cross-section CA are connected to the first surface 110 and the second surface 120, respectively. In detail, in this embodiment, each light-shading portion 130k may further have an imaginary surface S. The imaginary surface S is perpendicular to the first surface 110 and the second surface 120 and extends from the center of the third surface 131 to the second surface 120. The direction to which the imaginary surface S faces is perpendicular to the extension direction of the light-shading portion 130k. The light-shading portion 130k can be asymmetric to the imaginary surface S. Furthermore, the fourth surface 132 and the fifth surface 133 can be asymmetric to the imaginary surface S, while the sixth surface 134 and the seventh surface 135 can be asymmetric to the imaginary surface S. However, the present invention does not impose any further restrictions on the shape of the light-shading portion 130k. Similarly, in this embodiment, the shape of the light-transmitting portion 140k can be changed according to the shape of the light-shading portion 130k, while the present invention does not impose any further restrictions on the shape of the light-transmitting portion 140k.

Figure 14:
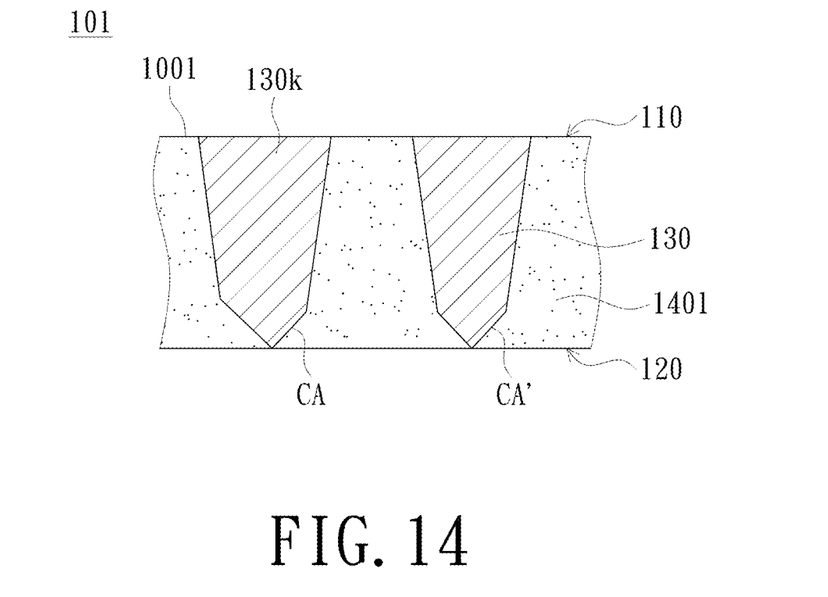
FIG. 14 is a schematic partial cross-sectional view of an optical film in another embodiment of the present invention.

FIG. 14 is a schematic partial cross-sectional view of an optical film in another embodiment of the present invention. The structure and advantages of the optical film 10l in this embodiment are similar to those in the embodiment of FIG. 1, and the differences are described below. In this embodiment, any two light-shading portions of all of the light-shading portions may have different shapes. For example, referring to FIG. 14, the grid layer 100l may include the light-shading portions 130 and 130k, and the light-shading portions 130 and 130k have different shapes. For example, the cross-section CA' of the light-shading portion 130 extending from the first surface 110 to the second surface 120 can be a symmetric shape, while the cross-section CA of the light-shading portion 130k extending from the first surface 110 to the second surface 120 can be an asymmetric shape. The other features of the light-shading portions 130 and 130k have been described earlier, and no redundant detail is to be given herein. It can be understood that in other embodiments, the grid layer 100l may include a light-shading portion 130, a light-shading portion 130j, a light-shading portion 130k, or a combination thereof, and the shape of the light-shading portion in this embodiment is not limited to the above examples. Similarly, the shape of the light-transmitting portion 140l in this embodiment can be changed according to the shape of the light-shading portion 130, the light-shading portion 130j, or the light-shading portion 130k, while the present invention does not impose any further restrictions on the shape of the light-transmitting portion 140l.

Figure 15:
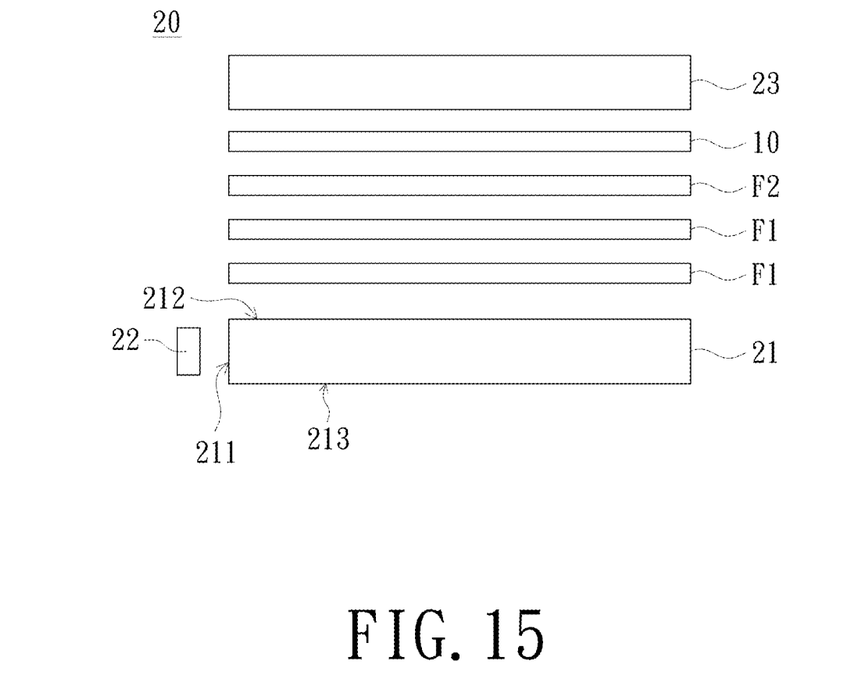
FIG. 15 is a schematic side view of a display device in an embodiment of the present invention.

FIG. 15 is a schematic side view of a display device in an embodiment of the present invention. Please refer to FIG. 15. The display device 20 includes a light guide plate 21, a light source 22, a display panel 23, and an optical film 10. The light guide plate 21 has a light incident surface 211 and a light exiting surface 212. The light exiting surface 212 is connected to the light incident surface 211. The light source 22 is arranged opposite to the light incident surface 211. The display panel 23 is arranged opposite to the light exiting surface 212. The optical film 10 is arranged between the light exiting surface 212 and the display panel 23.

The light guide plate 21 has, for example, a light incident surface 211 and a light exiting surface 212. The light incident surface 211 is connected to the light exiting surface 212 and is opposite to the light source 22. The material of the light guide plate 21 may include plastic, glass, or other materials suitable for allowing light to pass therethrough. For example, in this embodiment, the material of the light guide plate 21 may include polymethyl methacrylate (PMMA). However, in other embodiments, the material of the light guide plate 21 may include cyclic olefin polymer (COP) or polycarbonate (PC). In addition, the light guide plate 21 of this embodiment can be made by hot pressing or injection molding, but the present invention does not impose any further limitations on this. In one embodiment, the surface 213 of the light guide plate 21 opposite the light exiting surface 212 may have a light-scattering structure. The light-scattering structure can reflect more beams onto the light exiting surface 212, thereby increasing light utilization efficiency.

The light source 22 of this embodiment may include light-emitting diodes (LEDs), and the quantity of light-emitting diodes may be plural. Furthermore, the emission wavelength of the aforementioned light-emitting diode may include blue or white light, but the present invention does not impose any further limitations on this.

In this embodiment, the optical film 10 can be arranged on the side of the light guide plate 21 having the light incident surface 211. In addition, the optical film 10 can be the one closest to the display panel 23 among all the optical films of the display device 20. For example, the display device 20 may further include two diffusers F1 and a brightness enhancement film F2 (BEF). The diffusers F1 and the brightness enhancement film F2 are arranged between the light guide plate 21 and the optical film 10, and the optical film 10 is closer to the display panel 23 than the diffusers F1 and the brightness enhancement film F2. It can be understood that in one embodiment, the quantity of diffusers F1 and brightness enhancement films F2 is not limited to that shown in FIG. 15, and the diffusers F1 and the brightness enhancement film F2 can be replaced with other types of optical films. In another embodiment, the display device 20 may further have other types of optical films arranged between the light guide plate 21 and the optical film 10 according to actual needs, but the present invention does not impose any limitations on these details.

Figure 16:
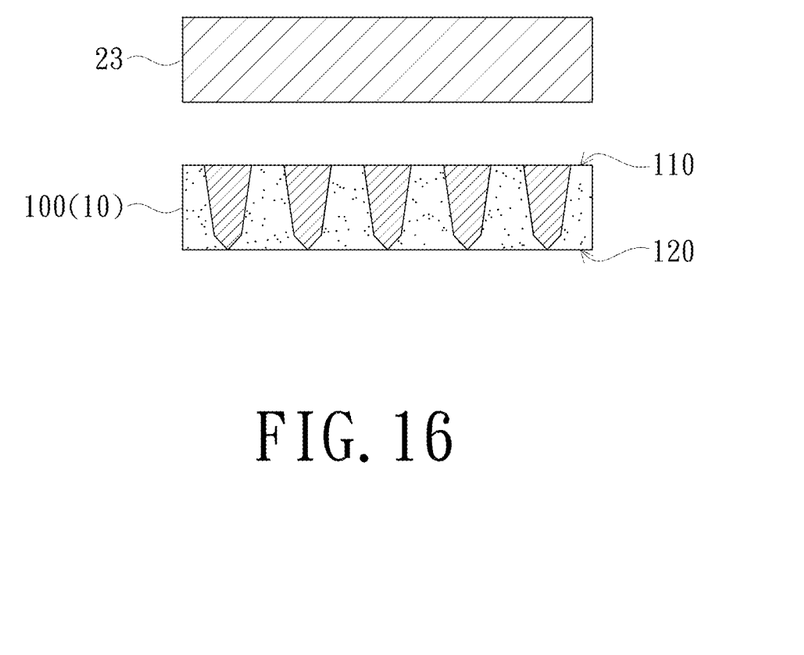
FIG. 16 is a schematic cross-sectional view of the optical film and the display panel shown in FIG. 15.
Figure 17:
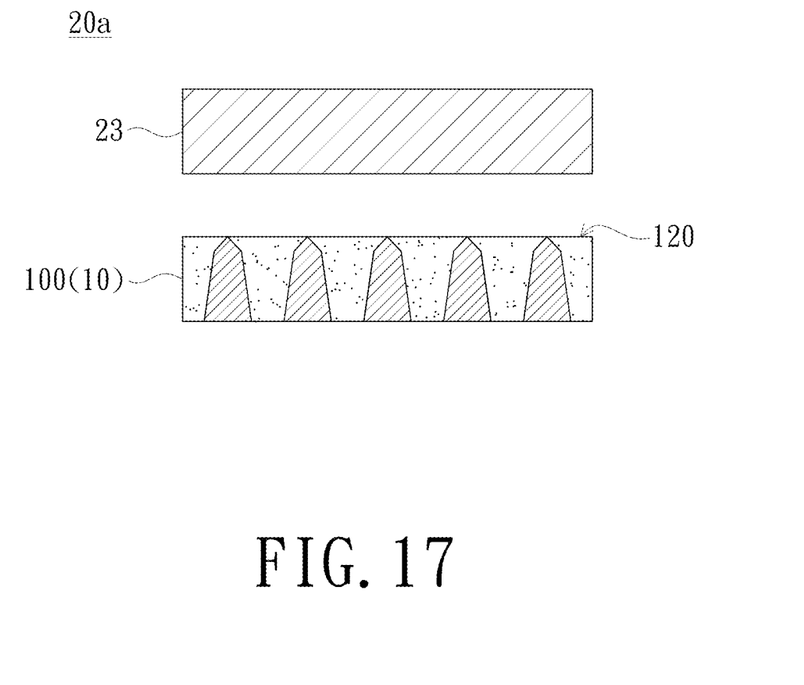
FIG. 17 is a schematic cross-sectional view of an optical film and a display panel of a display device of another embodiment of the present invention.

FIG. 16 is a schematic cross-sectional view of the optical film and the display panel shown in FIG. 15. FIG. 17 is a schematic cross-sectional view of an optical film and a display panel of a display device of another embodiment of the present invention. Please refer to FIGS. 15 and 16. The first surface 110 of the grid layer 100 faces the display panel 23. In other words, the light beam can enter the grid layer 100 from the second surface 120, leave the grid layer 100 from the first surface 110, and then be incident onto the display panel 23. However, in one embodiment such as the display device 20a shown in FIG. 17, the second surface 120 of the grid layer 100 may face the display panel 23 to provide a different effect of reducing the light output angle from the display device 20 in FIG. 16. For example, the beam angle of the beam emitted from the first surface 110 of the grid layer 100 in FIG. 16 may be smaller than that emitted from the second surface 120 of the grid layer 100 in FIG. 17. In this way, the optical film 10 can be arranged in the manner shown in FIG. 16 or FIG. 17 according to actual needs, and the present invention does not impose any further limitations on this.

Please refer to FIG. 15 again. The display panel 23 of this embodiment can receive the beam emitted from the optical film 10. The display panel 23 includes, for example, a liquid crystal display panel, but other embodiments are not limited to this.

Compared to the conventional technology, the display device 20 of this embodiment can reduce the stray light in large viewing angles and thus improve image quality due to the use of the optical film 10. Incidentally, in other embodiments, the optical film 10 can be replaced with the optical film 10a, 10b, 10c, 10d, 10e, 10f, 10g, 10h, 10i, 10j, 10k, or 10l.

Figure 18:
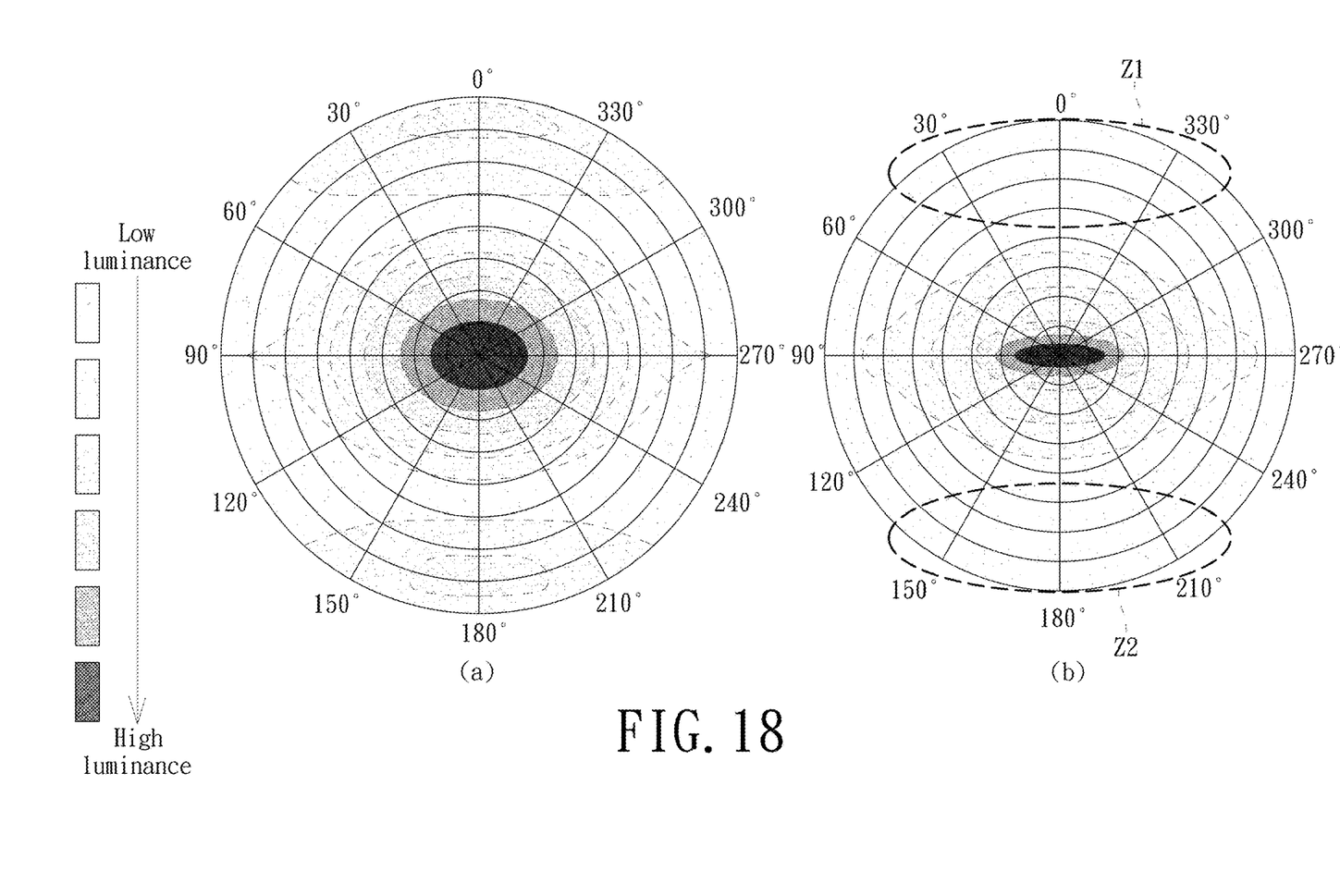
FIG. 18 is a schematic view of an output-light field pattern of a conventional display device and an output-light field pattern of a display device according to an embodiment of the present invention.
Figure 19:
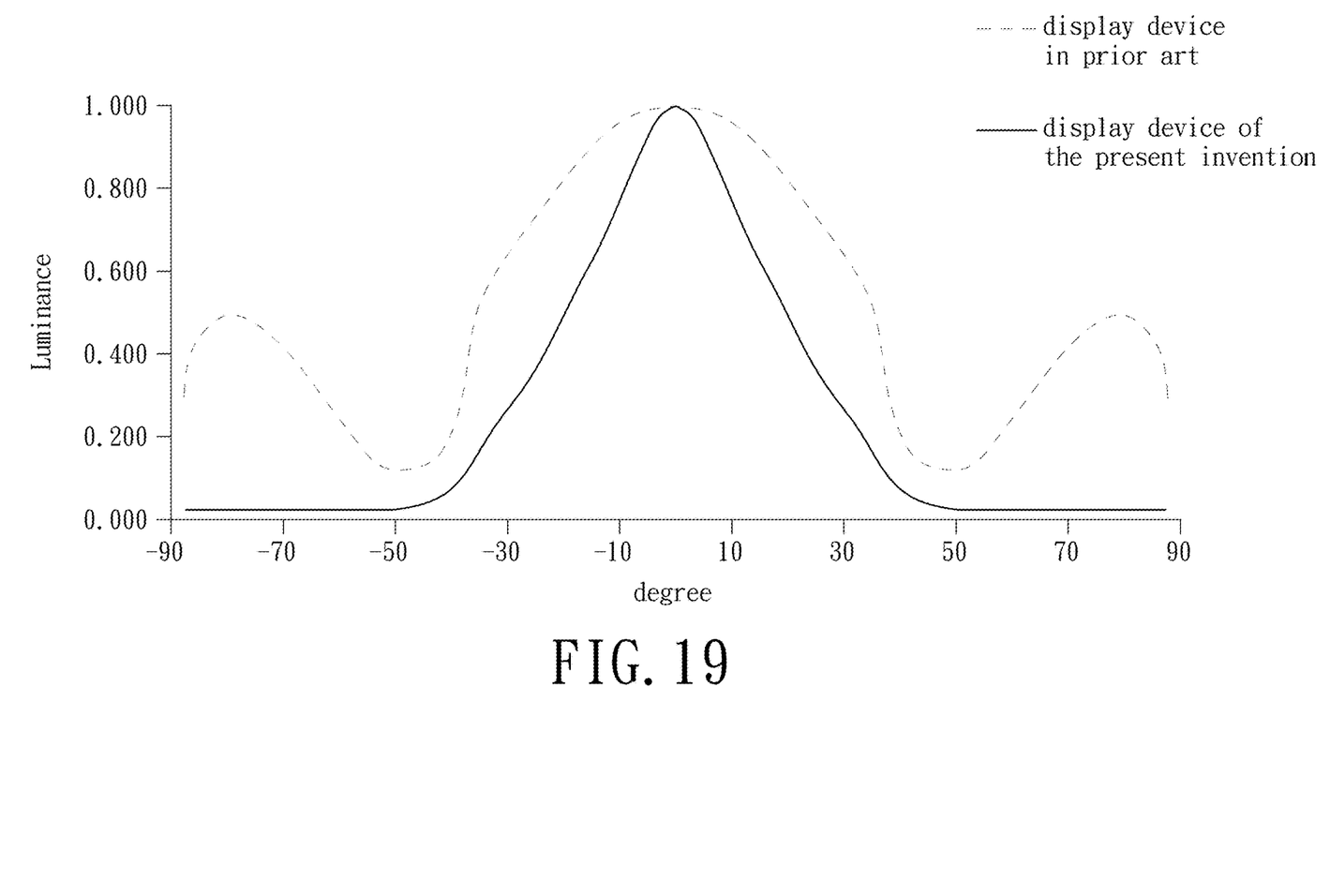
FIG. 19 is a schematic view of the distribution of a vertical-viewing-angle luminance of a conventional display device and a distribution of a vertical-viewing-angle luminance of a display device according to an embodiment of the present invention.

FIG. 18 is a schematic view of an output-light field pattern of a conventional display device and an output-light field pattern of a display device according to an embodiment of the present invention. FIG. 19 is a schematic view of the distribution of a vertical-viewing-angle luminance of a conventional display device and a distribution of a vertical-viewing-angle luminance of a display device according to an embodiment of the present invention. It should be noted that FIG. 18 illustrates the output-light intensity by the distribution density of dots. That is, the higher the distribution density of dots, the higher the output-light luminance in the respective area; on the contrary, the lower the distribution density of dots, the lower the output-light luminance in the respective area. Referring to FIG. 18 first, (a) is a schematic view of the output-light field pattern of a conventional display device, and (b) is a schematic view of the output-light field pattern of a display device according to an embodiment of the present invention. The distribution density of dots representing luminance in the regions Z1 and Z2 of the display device in the present invention shown in (b) is significantly lower than that of the conventional display device shown in (a). Therefore, the display device of the present invention can effectively reduce stray light emitted from a large angle of view. Furthermore, referring to FIG. 19, the display device of an embodiment of the present invention can reduce the luminance at the larger vertical angle of view, compared to a conventional display device. The aforementioned larger vertical angle of view is, for example, between about 50° to 90° and −50° to −90°. On the other hand, the display device of the present invention can concentrate light within a smaller vertical angle of view, which is approximately between −40° and 40°, but the present invention is not limited to this. Please refer to Table 1 for the full width at half maxima (FWHM) of the display device of an embodiment of the present invention and the conventional display device at vertical and horizontal viewing angles.

TABLE 1

|  | conventional display device | display device of the present invention |
| --- | --- | --- |
| FWHM at a horizontal viewing angle | 101.3 | 98.4 |
| FWHM at a vertical viewing angle | 69.9 | 41.7 |

Incidentally, due to having the feature of small vertical viewing angle, the display device 20 in one embodiment can be used as an anti-peep display device. In addition, in another embodiment, the display device 20 may be a vehicle display device. However, the present invention does not limit the specific use of the display device 20.

In summary, the optical film of the present invention adopts a grid layer, and the grid layer has a plurality of light-shading portions and a plurality of light-transmitting portions. In detail, the two opposite sides of the light-shading portion respectively have two surfaces connected and inclined to each other (i.e., the fourth surface, the fifth surface, the sixth surface, and the seventh surface), and the light-transmitting portion is located between the adjacent two light-shading portions. Therefore, the beam can incident on the fourth surface or the fifth surface when passing through the light-transmitting portion, then be reflected by the fourth surface or the fifth surface and then exit from the grid layer. Based on the above, the angle of the beam emitted from the grid layer is smaller than the angle of the beam incident to the grid layer. Therefore, the optical film of the present invention can reduce stray light formed due to excessive output angle. Due to the use of the aforementioned optical film, the display device of the present invention can reduce the stray light at a large angle of view, thereby improving image quality.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the disclosure" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. An optical film, comprising:
a grid layer, having a first surface, a second surface, a plurality of light-shading portions, and a plurality of light-transmitting portions, wherein the first surface is opposite and parallel to the second surface, the plurality of light-shading portions and the plurality of light-transmitting portions are located between the first surface and the second surface, and the plurality of light-shading portions and the plurality of light-transmitting portions are alternately arranged along the first surface;
each of the plurality of light-shading portions has a third surface, a fourth surface, a fifth surface, a sixth surface, and a seventh surface, the third surface are coplanar with the first surface, the fourth surface and the fifth surface are respectively connected to opposite sides of the third surface, an angle degree of a first included angle between the fourth surface and the third surface is A1, and an angle degree of a second included angle between the fifth surface and the third surface is A2;
the sixth surface is connected to the fourth surface and the second surface, the seventh surface is connected to the fifth surface and the second surface, an angle degree of a third included angle between the sixth surface and the second surface is A3, and an angle degree of a fourth included angle between the seventh surface and the second surface is A4;
wherein $85°<A1\leq90°$, $85°<A2\leq90°$, $0°<A3<85°$, $0°<A4<85°$, $A2\neq A4$, and $A1\neq A3$;
wherein each of the plurality of light-shading portions further has a first corner and a second corner,
the fourth surface has a first edge and a second edge opposite to each other, the first edge is adjacent to the third surface, the second edge is adjacent to the sixth surface, and the first corner is located between the fourth surface and the sixth surface;
the fifth surface has a third edge and a fourth edge opposite to each other, the third edge is adjacent to the third surface, the fourth edge is adjacent to the seventh surface, and the second corner is located between the fifth surface and the seventh surface;
in a first direction from the first surface to the second surface, the first corner and the second corner are away from the first surface and close to the second surface.

2. The optical film according to claim 1, wherein the light-shading portions are equidistant from each other on the first surface.

3. The optical film according to claim 2, wherein in a direction where the plurality of light-shading portions and the plurality of light-transmitting portions are alternately arranged along the first surface, a distance between a third edge of the fifth surface of one of the plurality of light-shading portions connected to the third surface and a third edge of the fifth surface of the adjacent another one of the plurality of light-shading portion connected to the third surface is between 30 um and 200 um.

4. The optical film according to claim 1, wherein in a first direction from the first surface to the second surface, a distance between the first surface and the second surface is between 30 um and 200 um.

5. The optical film according to claim 1, wherein a side of the sixth surface connected to the second surface is adjacent or not adjacent to a side of the seventh surface connected to the second surface in each of the plurality of light-shading portions.

6. The optical film according to claim 1, wherein a cross-section of each of the plurality of light-shading portions extending from the first surface to the second surface is asymmetrical.

7. The optical film according to claim 1, wherein any two of the plurality of light-shading portions have different shapes.

8. The optical film according to claim 1, further comprising a first light-transmitting plate, arranged on a side of the second surface away from the plurality of light-shading portions.

9. The optical film according to claim 8, further comprising a plurality of first light-scattering particles, arranged inside the first light-transmitting plate.

10. The optical film according to claim 8, further comprising a light-transmitting layer, arranged between the second surface and the first light-transmitting plate.

11. The optical film according to claim 8, further comprising a second light-transmitting plate, arranged on the first surface.

12. The optical film according to claim 11, further comprising a plurality of second light-scattering particles, arranged inside the second light-transmitting plate.

13. The optical film according to claim 11, wherein the second light-transmitting plate comprises a dual brightness enhancement film.

14. The optical film according to claim 1, wherein an absolute value of a difference in refractive index between the plurality of light-shading portions and the plurality of light-transmitting portions is greater than 0.005.

15. An optical film, comprising:
a grid layer, having a first surface, a second surface, a plurality of light-shading portions, and a plurality of light-transmitting portions, wherein the first surface is opposite and parallel to the second surface, the plurality of light-shading portions and the plurality of light-transmitting portions are located between the first surface and the second surface, and the plurality of light-shading portions and the plurality of light-transmitting portions are alternately arranged along the first surface;
each of the plurality of light-shading portions has a third surface, a fourth surface, a fifth surface, a sixth surface, and a seventh surface, the third surface are coplanar with the first surface, the fourth surface and the fifth surface are respectively connected to opposite sides of the third surface, an angle degree of a first included angle between the fourth surface and the third surface is A1, and an angle degree of a second included angle between the fifth surface and the third surface is A2;

the sixth surface is connected to the fourth surface and the second surface, the seventh surface is connected to the fifth surface and the second surface, an angle degree of a third included angle between the sixth surface and the second surface is A3, and an angle degree of a fourth included angle between the seventh surface and the second surface is A4;

wherein $85°<A1\leq90°$, $85°<A2\leq90°$, $0°<A3<85°$, $0°<A4<85°$, $A2\neq A4$, and $A1\neq A3$:

the optical film further comprises a first light-transmitting plate arranged on a side of the second surface away from the plurality of light-shading portions;

wherein the first light-transmitting plate has a first light-transmitting surface and a second light-transmitting surface, the first light-transmitting surface and the second light-transmitting surface are opposite to each other, the first light-transmitting surface is arranged on the side of the second surface away from the plurality of light-shading portions, and the second light-transmitting surface has a plurality of first microstructures.

16. An optical film, comprising:

a grid layer, having a first surface, a second surface, a plurality of light-shading portions, and a plurality of light-transmitting portions, wherein the first surface is opposite and parallel to the second surface, the plurality of light-shading portions and the plurality of light-transmitting portions are located between the first surface and the second surface, and the plurality of light-shading portions and the plurality of light-transmitting portions are alternately arranged along the first surface;

each of the plurality of light-shading portions has a third surface, a fourth surface, a fifth surface, a sixth surface, and a seventh surface, the third surface are coplanar with the first surface, the fourth surface and the fifth surface are respectively connected to opposite sides of the third surface, an angle degree of a first included angle between the fourth surface and the third surface is A1, and an angle degree of a second included angle between the fifth surface and the third surface is A2;

the sixth surface is connected to the fourth surface and the second surface, the seventh surface is connected to the fifth surface and the second surface, an angle degree of a third included angle between the sixth surface and the second surface is A3, and an angle degree of a fourth included angle between the seventh surface and the second surface is A4;

wherein $85°<A1\leq90°$, $85°<A2\leq90°$, $0°<A3<85°$, $0°<A4<85°$, $A2\neq A4$, and $A1\neq A3$;

the optical film further comprises a first light-transmitting plate arranged on a side of the second surface away from the plurality of light-shading portions;

the optical film further comprises a second light-transmitting plate arranged on the first surface;

wherein the second light-transmitting plate has a third light-transmitting surface and a fourth light-transmitting surface, the third light-transmitting surface and the fourth light-transmitting surface are opposite to each other, the third light-transmitting surface is arranged on the first surface, and the fourth light-transmitting surface has a plurality of second microstructures.

17. A display device, comprising:

a light guide plate, having a light incident surface and a light exiting surface, wherein the light exiting surface is connected to the light incident surface;

a light source, arranged opposite to the light incident surface;

a display panel, arranged opposite to the light exiting surface; and an optical film, arranged between the light exiting surface and the display panel, wherein the optical film comprises:

a grid layer, having a first surface, a second surface, a plurality of light-shading portions, and a plurality of light-transmitting portions, wherein the first surface is opposite and parallel to the second surface, the plurality of light-shading portions and the plurality of light-transmitting portions are located between the first surface and the second surface, and the plurality of light-shading portions and the plurality of light-transmitting portions are alternately arranged along the first surface;

each of the plurality of light-shading portions has a third surface, a fourth surface, a fifth surface, a sixth surface, and a seventh surface, the third surface are coplanar with the first surface, the fourth surface and the fifth surface are respectively connected to opposite sides of the third surface, an angle degree of a first included angle between the fourth surface and the third surface is A1, and an angle degree of a second included angle between the fifth surface and the third surface is A2;

the sixth surface is connected to the fourth surface and the second surface, the seventh surface is connected to the fifth surface and the second surface, an angle degree of a third included angle between the sixth surface and the second surface is A3, and an angle degree of a fourth included angle between the seventh surface and the second surface is A4;

wherein $85°<A1\leq90°$, $85°<A2\leq90°$, $0°<A3<85°$, $0°<A4<85°$, $A2\neq A4$, and $A1\neq A3$;

wherein each of the plurality of light-shading portions further has a first corner and a second corner, the fourth surface has a first edge and a second edge opposite to each other, the first edge is adjacent to the third surface, the second edge is adjacent to the sixth surface, and the first corner is located between the fourth surface and the sixth surface;

the fifth surface has a third edge and a fourth edge opposite to each other, the third edge is adjacent to the third surface, the fourth edge is adjacent to the seventh surface, and the second corner is located between the fifth surface and the seventh surface;

in a first direction from the first surface to the second surface, the first corner and the second corner are away from the first surface and close to the second surface.

18. The display device according to claim 17, wherein the first surface or the second surface faces the display panel.

* * * * *